US012771404B2

(12) United States Patent
Muljono et al.

(10) Patent No.: US 12,771,404 B2
(45) Date of Patent: Oct. 20, 2026

(54) ACTIVE ELECTRONIC SIGNAL CROSSTALK CANCELLATION

(71) Applicant: Intel Products IP LLC, Santa Clara, CA (US)

(72) Inventors: Harry Muljono, San Ramon, CA (US); Changhong Lin, Cupertino, CA (US); Mohammad Mamunur Rashid, Hillsboro, OR (US)

(73) Assignee: Intel Products IP LLC, Santa Clara, CA (US)

(*) Notice: Subject to any disclaimer, the term of this patent is extended or adjusted under 35 U.S.C. 154(b) by 0 days.

(21) Appl. No.: 17/957,053

(22) Filed: Sep. 30, 2022

(65) Prior Publication Data

US 2024/0113743 A1 Apr. 4, 2024

(51) Int. Cl.
*H04B 3/32* (2006.01)

(52) U.S. Cl.
CPC ..................................... *H04B 3/32* (2013.01)

(58) Field of Classification Search
CPC ........................................................ H04B 3/32
USPC .......................................................... 375/262
See application file for complete search history.

(56) References Cited

U.S. PATENT DOCUMENTS 6,034,414 A * 3/2000 Lin .......................... H10D 1/68 257/595
9,781,254 B1 * 10/2017 Anim-Appiah .......... H04B 3/32
2013/0058175 A1 * 3/2013 Lin ..................... G06F 13/1689 365/193
2020/0098921 A1 * 3/2020 Rachmady ......... H10D 84/0186
2023/0232155 A1 * 7/2023 Dhanasekaran ........ H04S 1/005 381/94.1

* cited by examiner

*Primary Examiner* — Lihong Yu
(74) *Attorney, Agent, or Firm* — Schwegman Lundberg & Woessner, P.A.

(57) ABSTRACT

An improved circuit for generating a crosstalk noise cancellation signal may be used for combining the crosstalk noise cancellation signal with a victim signal without a crosstalk cancelling capacitor. The improved crosstalk cancellation circuit may be used to provide improved TX crosstalk cancellation, and may be used to provide improved performance of increasingly higher speed memory systems regardless of memory process technology, enabling improvements to existing and future memory systems and other communication systems. The improved crosstalk cancellation circuit may include a transmission amplifier to receive a first digital signal and generate a first analog output signal, a crosstalk cancellation circuit to receive the second digital signal and generate an analog cancellation signal, and a first conductive node to generate a first crosstalk canceled signal by combining the first analog output signal with the analog cancellation signal.

17 Claims, 8 Drawing Sheets

ACTIVE ELECTRONIC SIGNAL CROSSTALK CANCELLATION

TECHNICAL FIELD

Embodiments described herein generally relate to electronic signal crosstalk cancellation.

BACKGROUND

In digital and analog communication systems, a given communication channel may be affected by crosstalk interference from one or more signals from multiple communication channels. This crosstalk interference may be caused by undesired electromagnetic coupling among nearby communication channels, such as from conductive, capacitive, or inductive coupling among nearby conductors. For single-ended high-speed computer bus interfaces such as double data rate (DDR), far-end crosstalk (FEXT) may be a significant source of noise that causes signal distortion. Crosstalk interference may affect DDR and other high-speed communication performance, such as causing signal margin degradation.

Crosstalk cancellation schemes fall generally into receiver (RX) crosstalk cancellation or transmitter (TX) crosstalk cancellation. RX crosstalk cancellation may rely on perfect alignment (e.g., timing) of an aggressor signal to achieve meaningful cancellation of the crosstalk noise caused by the aggressor signal. However, this alignment may not be achieved due to variations in signal routing within an integrated circuit (IC) package and printed circuit board (PCB) board memory interconnect. As communications speed continue to increase, the practicality and effectiveness of RX crosstalk cancellation is increasingly difficult to achieve due to the tight matching requirement between the aggressor signal and victim signal. What is needed is an improved TX crosstalk cancellation solution.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Technical solutions described herein include an improved circuit for generating a crosstalk noise cancellation signal, and for combining the crosstalk noise cancellation signal with a victim signal without a crosstalk cancellation capacitor. The improved crosstalk cancellation circuit may be used to provide improved TX crosstalk cancellation, and may be used to provide improved performance of increasingly higher speed memory systems (e.g., dynamic random-access memory (DRAM)) regardless of memory process technology (e.g., DDR4, DDR5, etc.), enabling improvements to existing and future memory systems and other communication systems.

In the following description, for purposes of explanation, numerous specific details are set forth to provide a thorough understanding of some example embodiments. It will be evident, however, to one skilled in the art that the present disclosure may be practiced without these specific details.

Figure 1:
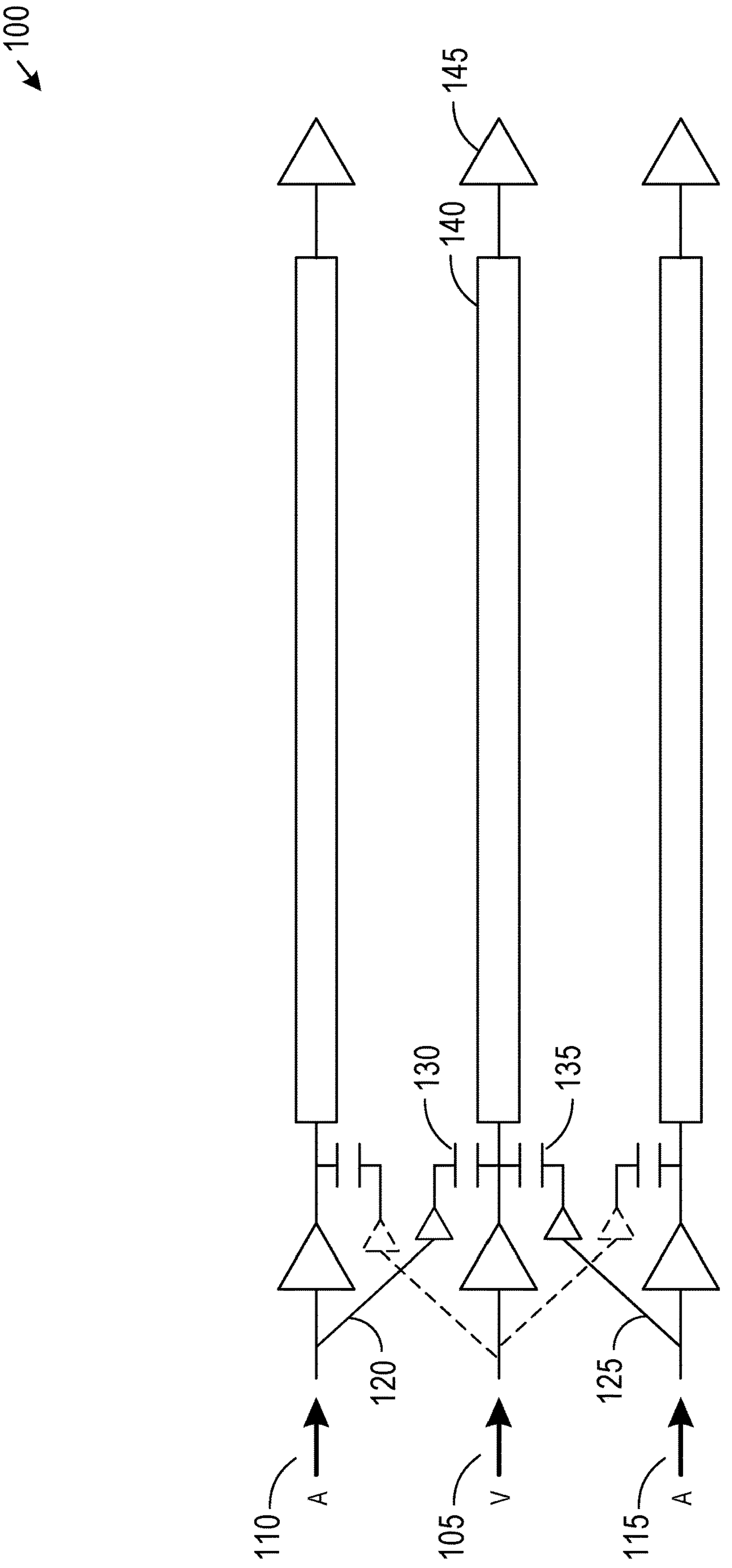
FIG. 1 is a block diagram illustrating a TX crosstalk cancellation system, according to an embodiment.

FIG. 1 is a block diagram illustrating a TX crosstalk cancellation system 100, according to an embodiment. System 100 includes a victim signal 105, a first aggressor signal 110, and a second aggressor signal 115. To reduce crosstalk caused by the first aggressor bitstream signal 110, a first signal line 120 may be cross-coupled through a first capacitor 130 to the victim transmission line 140. Similarly, a second signal line 125 may be cross-coupled through a second capacitor 135 to the victim transmission line 140. The victim signal 105 may be combined with the cross-coupled signals to reduce or eliminate inductive crosstalk, then fed through the victim transmission line 140 to a victim receiver 145.

Figure 2:
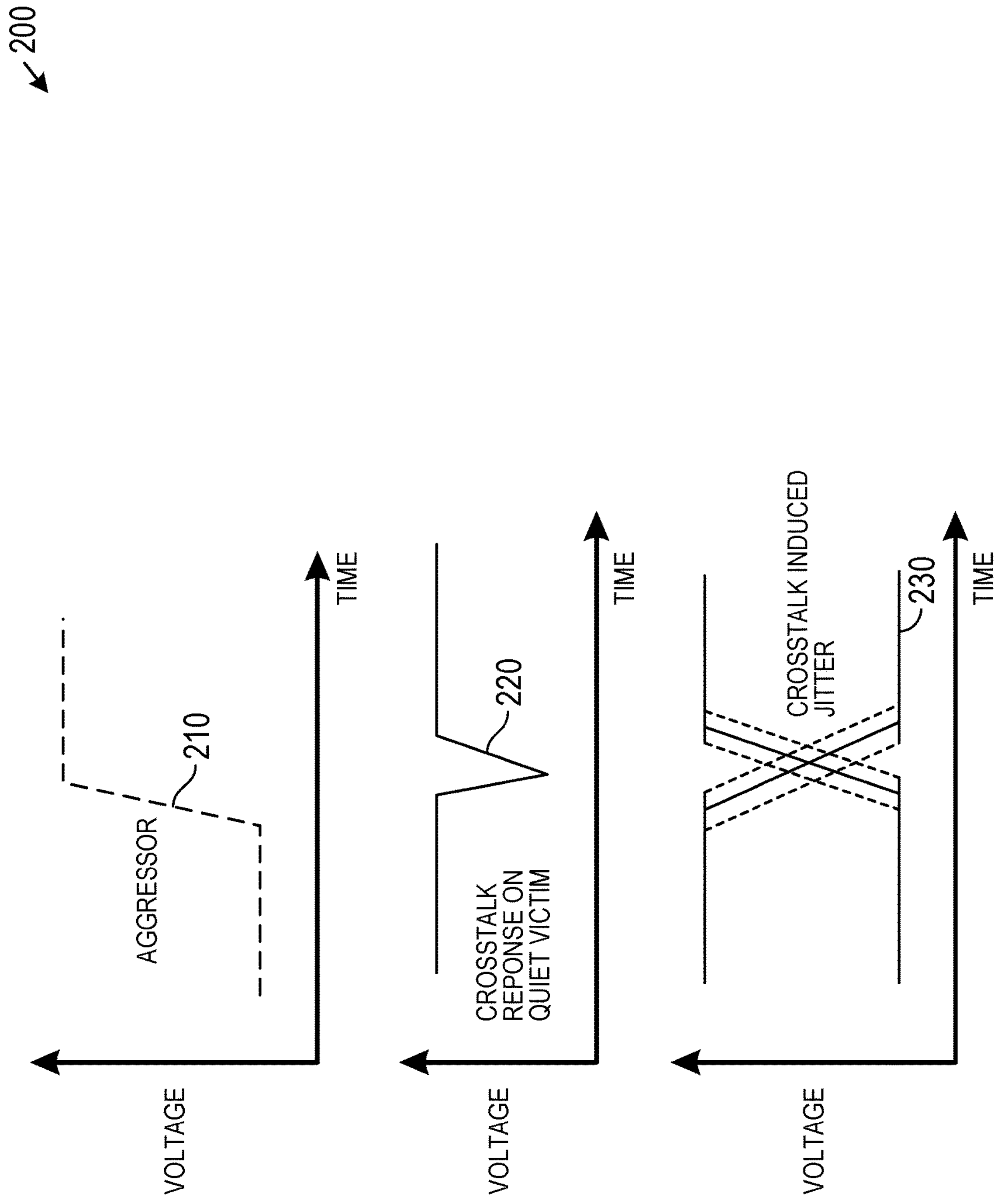
FIG. 2 shows crosstalk waveforms, according to an embodiment.

FIG. 2 shows crosstalk waveforms 200, according to an embodiment. Crosstalk waveforms 200 shows an aggressor waveform 210 showing a low-to-high bit transition, such as may be seen within first aggressor bitstream signal 110 shown in FIG. 1. The aggressor waveform 210 may cause a crosstalk response 220 in a victim signal line, such as when the signal transition from first aggressor bitstream signal 110 is coupled through mutual inductance or capacitance. The crosstalk response 220 may result in crosstalk-induced jitter 230 in the waveform of the victim signal line. A cancellation of crosstalk response 220 is shown and described with respect to FIG. 3.

Figure 3:
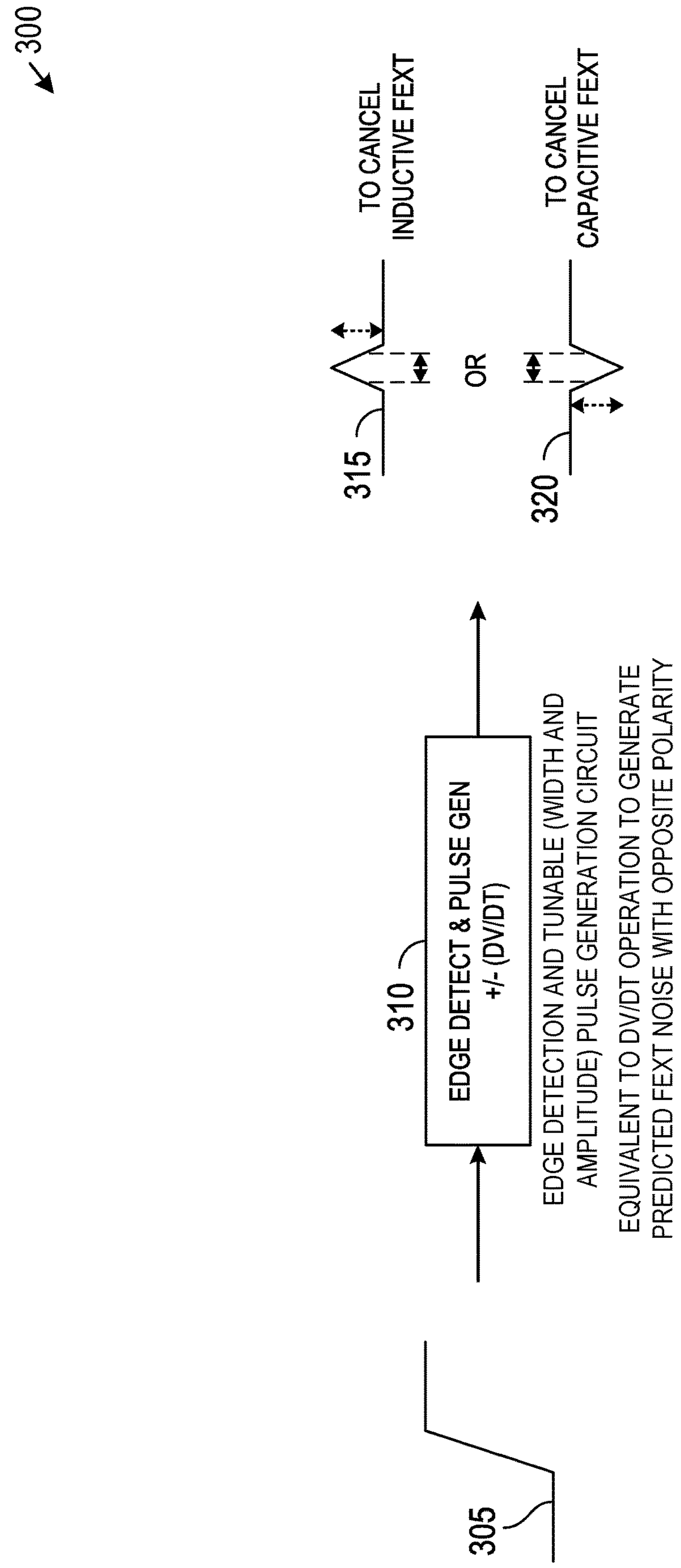
FIG. 3 shows an edge detection and pulse generation system, according to an embodiment.

FIG. 3 shows an edge detection and pulse generation system 300, according to an embodiment. System 300 receives an input bit transition 305 at an edge detection and pulse generation block 310, and generates either an inductive cancellation signal 315 or a capacitive cancellation signal 320. The communication circuit may be analyzed during design, manufacture, or test to determine if feedback is primarily inductive or capacitive, and pulse generation block 310 may be designed or configured accordingly to provide either an inductive or capacitive cancellation pulse signal. The pulse generation block 310 may be configured to tune the amplitude and width of the cancellation pulse. Analogous to taking derivative on continuous signal to find rate of change, the pulse generation block 310 leverages edge detection in digital domain to identify a signal transition, and controls pulse generation circuitry to create the appropriate cancellation pulse.

The edge detection and pulse generation system 300 provides advantages over solutions that rely on crosstalk cancelling capacitor implementations, such as in TX crosstalk cancellation system 100. As shown in FIG. 3, edge detection and pulse generation system 300, TX crosstalk cancellation may include removing predicted crosstalk noise at a transmitter output based on the information of aggressor data. For a CPU DDR communication channel, crosstalk may be primarily caused by inductive coupling due to socket pin via mechanical structure. This inductive coupling may be reduced using a crosstalk cancelling capacitor to cross-couple victim signal lanes and aggressor bitstream signal lanes. However, an on-chip crosstalk capacitor may not be compatible with memory manufacturing processes, such as with DRAM process that include four to six metal layers. The edge detection and pulse generation system 300 provides a crosstalk mitigation solution that does not require capacitor coupling for crosstalk cancellation. For example, after system 300 generates the crosstalk noise cancelling pulse, the pulse can be superimposed with a victim signal by cross-coupling without a crosstalk cancelling capacitor, such as shown in FIG. 4.

Figure 4:
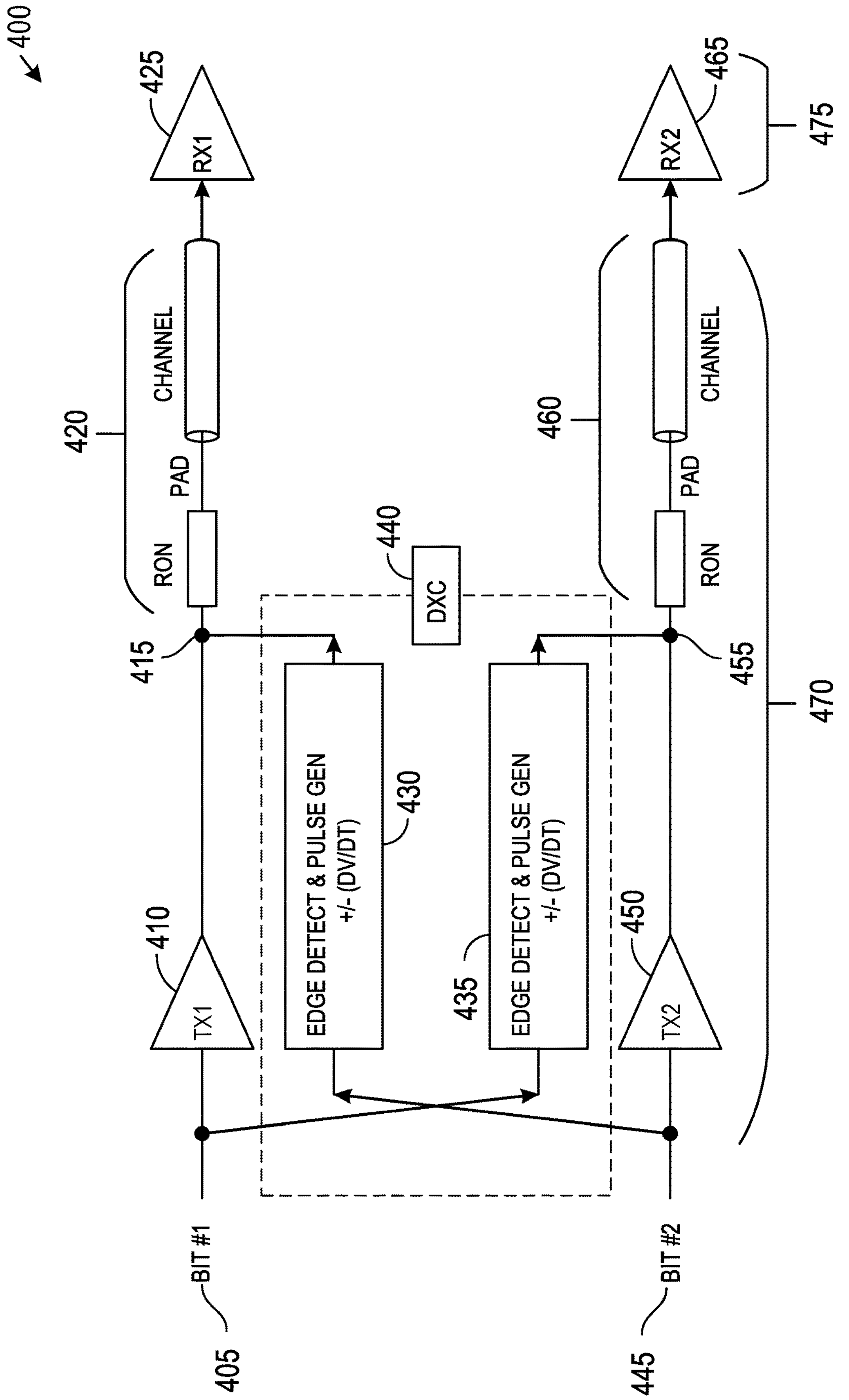
FIG. 4 shows a dual channel crosstalk cancellation architecture, according to an embodiment.

FIG. 4 shows a dual channel crosstalk cancellation architecture 400, according to an embodiment. The dual channel crosstalk cancellation architecture 400 shows an example implementation that provides crosstalk cancellation for two channels. As shown in FIG. 4, a first bitstream 405 is provided to a first digital-to-analog amplifier 410. A second bitstream 445 is provided to a first edge detect and pulse generator circuit 430. Pulse generator circuit 430 generates a crosstalk cancellation signal based on second bitstream 445, which is combined with the output of first digital-to-analog amplifier 410 at a first node 415 to cancel the crosstalk interference generated by second bitstream 445. The crosstalk-cancelled signal is provided through a first serial resistor, first conductive pad, and first channel 420 to a first receiver 425.

For the second communication channel, a second bitstream 445 is provided to a second digital-to-analog amplifier 450. The first bitstream 405 is provided to a second edge detect and pulse generator circuit 435. Pulse generator circuit 435 generates a crosstalk cancellation signal based on first bitstream 405, which is combined with the output of second digital-to-analog amplifier 450 at a second node 455 to cancel the crosstalk interference generated by first bitstream 405. The crosstalk-cancelled signal is provided through a second serial resistor, second conductive pad, and second channel 460 to a second receiver 465. In an example, the first receiver 425 and the second receiver 465 may be included within a receiver IC chiplet 475, and the remainder of the dual channel crosstalk cancellation architecture 400 may be included within a transmitter IC chiplet 470. The transmitter circuitry 470 and the receiver IC chiplet 475 may be included within a multi-chip package, a hybrid IC, or other multiple chiplet IC.

The pulse generator circuit 430 and the pulse generator circuit 435 may be combined within a digital crosstalk cancellation circuit 440. While dual channel crosstalk cancellation architecture 400 is shown with respect to two channels, a similar configuration may be implemented for three or more channels. For various multiple-channel implementations, the proximity of the channels may result in different inductive or capacitive coupling between each pair of communication paths, and the crosstalk cancellation within a digital crosstalk cancellation circuit 440 may be tuned for each pair of communication paths to modify cancellation pulse amplitude or width.

Figure 5:
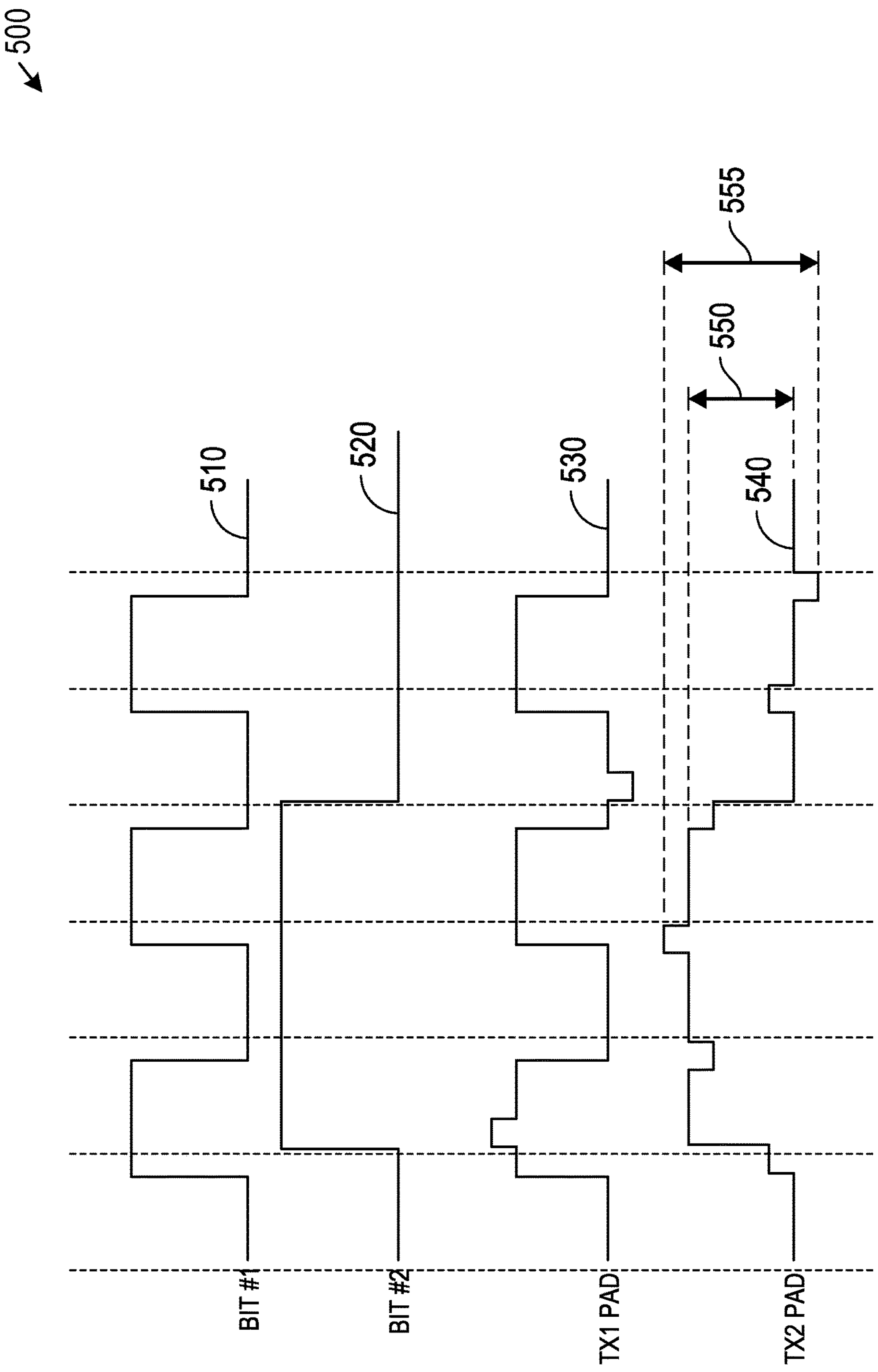
FIG. 5 shows crosstalk cancellation waveforms, according to an embodiment.

FIG. 5 shows crosstalk cancellation waveforms 500, according to an embodiment. Waveforms 500 include a first bitstream 510 and a second bitstream 520, which show bit transitions for each bitstream. The first transmission pad waveform 530 shows the combination (e.g., superposition) of the first bitstream 510 and a crosstalk cancellation pulse as seen from the first transmission conductive pad. Similarly, the second transmission pad waveform 540 shows the combination of the second bitstream 520 and a crosstalk cancellation pulse as seen from the second transmission conductive pad. The crosstalk cancellation waveforms 500 show that inverted crosstalk noise appears as a small delta voltage 555 above or below the normal signal DC level 550.

Figure 6:
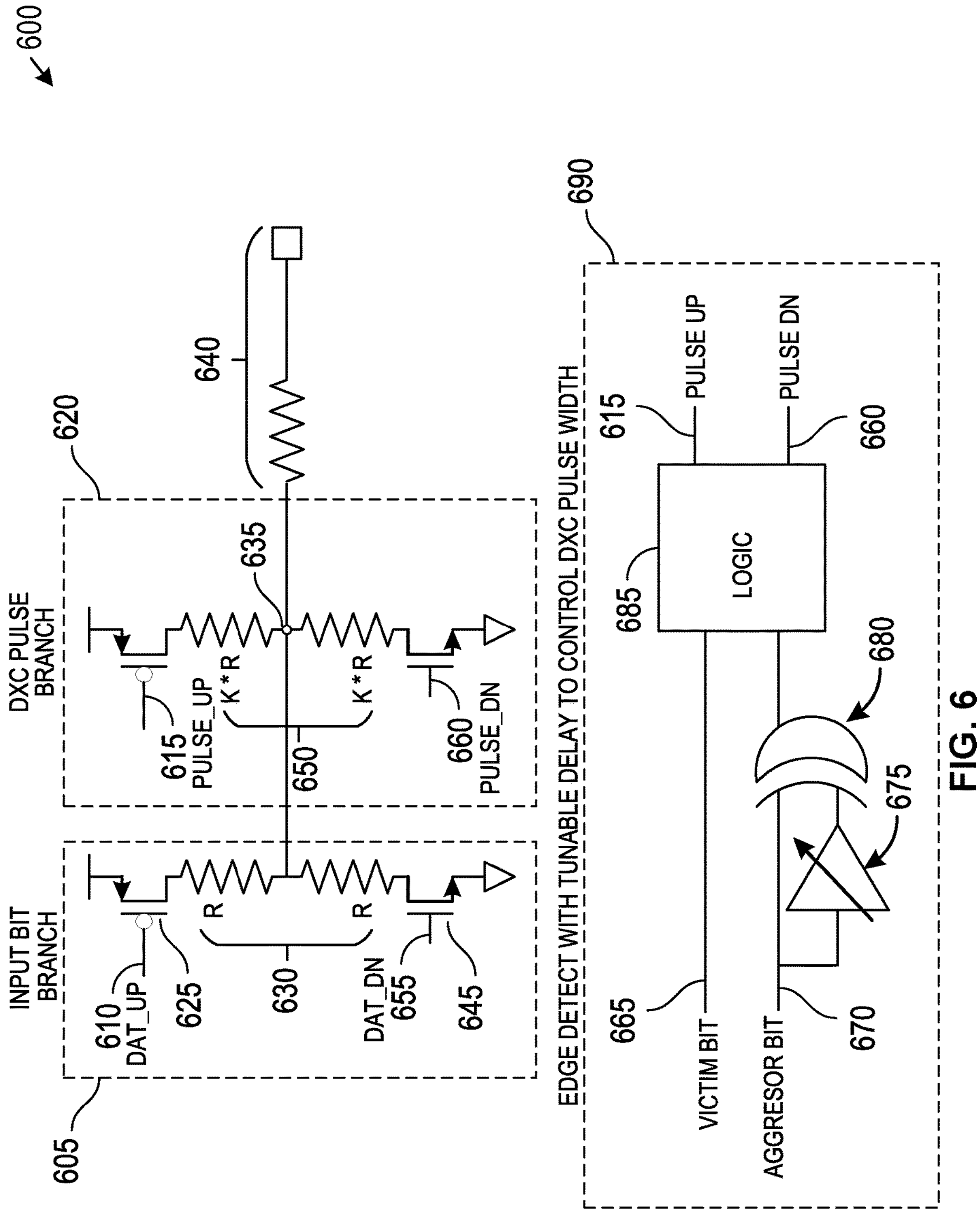
FIG. 6 shows a crosstalk cancellation circuit implementation, according to an embodiment.

FIG. 6 shows a crosstalk cancellation circuit implementation 600, according to an embodiment. The crosstalk cancellation circuit implementation 600 includes an inverting input bit branch 605 and an inverting digital crosstalk cancellation pulse branch 620. The input bit branch 605 may receive an input data bit-up line 610 at a first pMOS transistor 625, where input data bit-up line 610 turns ON (e.g., provides a low voltage) the first pMOS transistor 625 in response to detecting an input data bit is low (e.g., logical zero). Similarly, input bit branch 605 may receive an input data bit-down line 655 at a first nMOS transistor 645, where input data bit-down line 655 turns ON the first nMOS transistor 645 in response to detecting the input data bit is high (e.g., logical one). The first pMOS transistor 625 and the first nMOS transistor 645 are coupled through first resistors 630 to node 635. In normal operation mode, DAT_UP and DAT_DN share the same polarity, such that 605 operates as an inverting buffer.

Similarly, the digital crosstalk cancellation pulse branch 620 may receive a crosstalk pulse-up line 615 at a second pMOS transistor, where crosstalk pulse-up line 615 turns ON pMOS in response to detecting a crosstalk cancellation pulse signal 615 is logic low. Similarly, digital crosstalk cancellation pulse branch 620 may receive a crosstalk pulse-down line 660 at a second nMOS transistor, where crosstalk pulse-down line 660 turns ON nMOS in response to detecting the crosstalk cancellation pulse signal is logic high. The second pMOS transistor and the second nMOS transistor are coupled through second resistors 650 to node 635. In an embodiment, the resistive value of second resistors 650 are selected in proportion (e.g., using scaling factor K) to the resistive value of first resistors 630, such as to tune the amplitude of the cancellation pulse applied at node 635. The combined signal provided by input bit branch 605 and digital crosstalk cancellation pulse branch 620 at node 635 is provided to a series resistor and conductive pad 640 to be transmitted to a first receiver (not shown).

The crosstalk cancellation circuit implementation 600 also shows an example crosstalk cancellation circuit 690, which may be used to generate signals for crosstalk pulse-up line 615 and crosstalk pulse-down line 660. An aggressor bit 670 may be applied through a tunable delay amplifier 675 and through an XOR gate 680, which may be used to control a crosstalk cancellation pulse width. The output of the XOR gate 680 and a victim bit 665 may be applied to a logic circuit 685, which may be used to generate signals for the crosstalk pulse-up line 615 and the crosstalk pulse-down line 660 to be applied within the digital crosstalk cancellation pulse branch 620.

In an example, the crosstalk cancellation circuit 690 and digital crosstalk cancellation pulse branch 620 may be implemented within pulse generator circuit 430. Though FIG. 4 shows pulse generator circuit 430 receiving only second bitstream 445 as input, pulse generator circuit 430 may also receive first bitstream 405, similar to crosstalk cancellation circuit 690 using both bitstreams to detect and generate pulses for crosstalk cancellation.

The crosstalk cancellation circuit implementation 600 may provide improved crosstalk mitigation performance, particularly for DDR and other high-speed memory implementations. For DDR and other memory implementations that provide a relatively low number of metal layers (e.g., four to six layers), the crosstalk cancellation circuit implementation 600 provides improved crosstalk cancellation without requiring a crosstalk cancellation capacitor. Further, this implementation of crosstalk cancellation within the memory provides more efficient and reliable crosstalk cancellation than receiver-side crosstalk cancellation, such as by avoiding the need for accurate timing information at the receiver.

Figure 7:
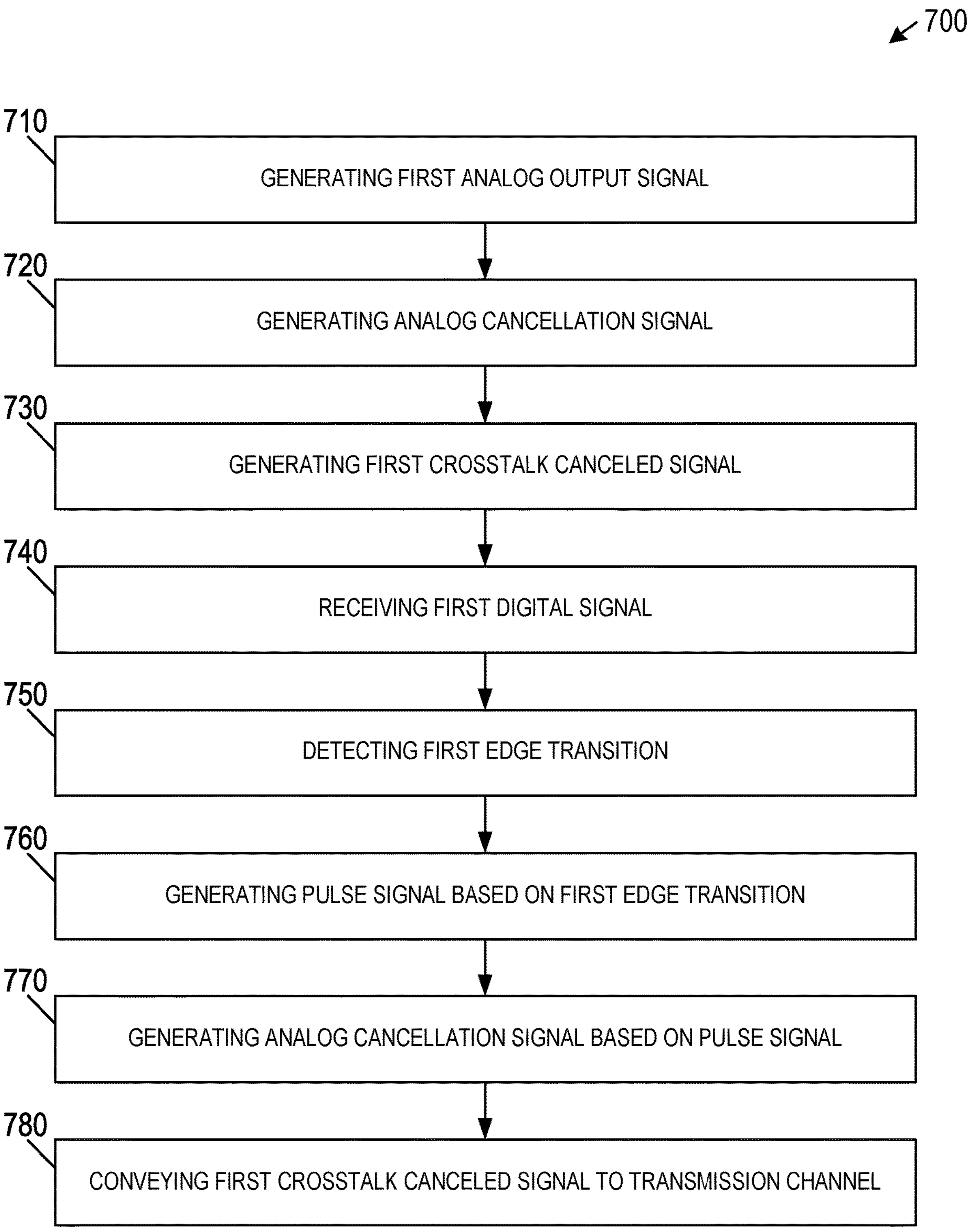
FIG. 7 is a flowchart illustrating a method for crosstalk cancellation, according to an embodiment.

FIG. 7 is a flowchart illustrating a method for crosstalk cancellation 700, according to an embodiment. Method 700 includes generating 710, at a transmission amplifier, a first analog output signal based on a first digital signal, the first digital signal including a crosstalk signal caused by a second digital signal. Method 700 includes generating 720, at a crosstalk cancellation circuit, an analog cancellation signal configured to cancel the crosstalk signal within the first digital signal without requiring a crosstalk cancellation capacitor. Method 700 includes generating 730, at a first conductive node, a first crosstalk canceled signal by combining the first analog output signal with the analog cancellation signal.

Method 700 may further include receiving 740 the first digital signal at the crosstalk cancellation circuit, wherein the analog cancellation signal is generated based on the first digital signal and the second digital signal. Method 700 may further include detecting 750, at an edge detection circuit within the crosstalk cancellation circuit, a first edge transition within the first digital signal and a second edge transition within the second digital signal. Method 700 may further include generating 760, at a pulse generation circuit, a pulse signal based on the first edge transition and the second edge transition. Method 700 may further include generating 770, at an analog cancellation circuit, the analog cancellation signal based on the pulse signal. Method 700 may further include conveying 780 the first crosstalk canceled signal from the first conductive node through a first serial resistor to a first transmission channel.

The analog cancellation circuit may include a pMOS transistor and an nMOS transistor. The pulse generation circuit may include a conductive pulse up trace coupled to the pMOS transistor, and a conductive pulse down trace coupled to the nMOS transistor. The pulse generation circuit may include a tunable delay circuit to control a pulse width of the analog cancellation signal. The analog cancellation circuit may include a pulse up resistor coupled between the pMOS transistor and the first conductive node. The analog cancellation circuit may further include a pulse down resistor coupled between the nMOS transistor and the first conductive node. The pulse up resistor may have an associated pulse up resistance coefficient configured to tune a positive amplitude of the analog cancellation signal. The pulse up resistor may have an associated pulse down resistance coefficient configured to tune a negative amplitude of the analog cancellation signal.

Figure 8:
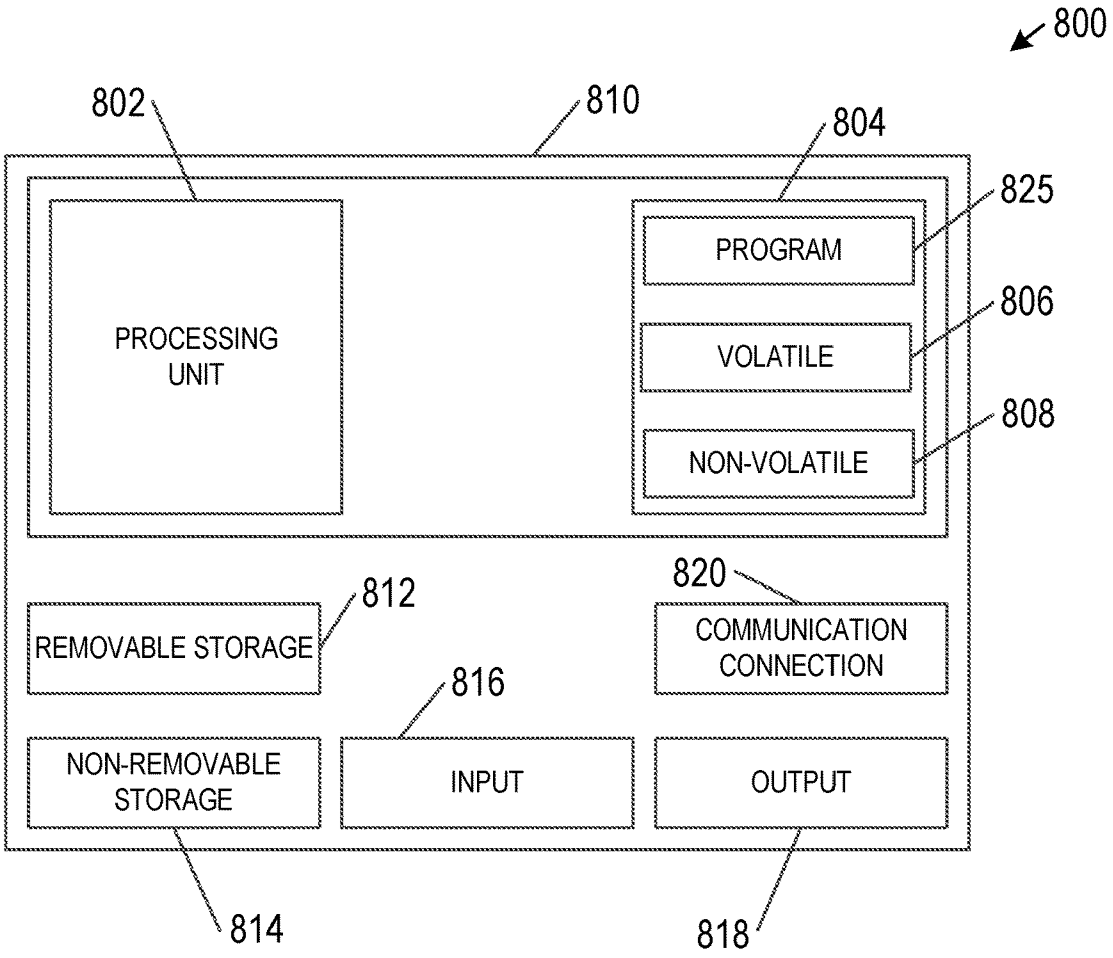
FIG. 8 is a block diagram of a computing device, according to an embodiment.

FIG. 8 is a block diagram of a computing device 800, according to an embodiment. The performance of one or more components within computing device 800 may be improved by including one or more of the circuits or circuitry methods described herein. Computing device 800 may include a transmission amplifier to receive a first digital signal and generate a first analog output signal, a crosstalk cancellation circuit to receive a second digital signal and generate an analog cancellation signal, and a first conductive node to generate a first crosstalk canceled signal by combining the first analog output signal with the analog cancellation signal.

In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 8 is an example of a client device that may invoke methods described herein over a network. In some embodiments, the computing device of FIG. 8 is an example of one or more of the personal computer, smartphone, tablet, or various servers.

One example computing device in the form of a computer 810, may include a processing unit 802, memory 804, removable storage 812, and non-removable storage 814. Although the example computing device is illustrated and described as computer 810, the computing device may be in different forms in different embodiments. For example, the computing device may instead be a smartphone, a tablet, or other computing device including the same or similar elements as illustrated and described with regard to FIG. 8. Further, although the various data storage elements are illustrated as part of the computer 810, the storage may include cloud-based storage accessible via a network, such as the Internet.

Returning to the computer 810, memory 804 may include volatile memory 806 and non-volatile memory 808. Computer 810 may include or have access to a computing environment that includes a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The input 816 may include one or more of a touchscreen, touchpad, mouse, keyboard, camera, and other input devices. The input 816 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 820 to connect to one or more remote computers, such as database servers, web servers, and another computing device. An example remote computer may include a personal computer (PC), server, router, network PC, a peer device or other common network node, or the like. The communication connection 820 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 802 of the computer 810. A hard drive (magnetic disk or solid state), CD-ROM, and RAM are some examples of articles including a non-transitory computer-readable medium. For example, various computer programs 825 or apps, such as one or more applications and modules implementing one or more of the methods illustrated and described herein or an app or application that executes on a mobile device or is accessible via a web browser, may be stored on a non-transitory computer-readable medium.

The apparatuses and methods described above may include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, the term "on" used with respect to two or more elements (e.g., materials), one "on" the other, means at least some contact between the elements (e.g., between the materials). The term "over" means the elements (e.g., materials) are in close proximity, but possibly with one or more additional intervening elements (e.g., materials) such that contact is possible but not required. Neither "on" nor "over" implies any directionality as used herein unless stated as such.

In the detailed description and the claims, a list of items joined by the term "at least one of" may mean any combination of the listed items. For example, if items A and B are listed, then the phrase "at least one of A and B" means A only; B only; or A and B. In another example, if items A, B, and C are listed, then the phrase "at least one of A, B and C" means A only; B only; C only; A and B (excluding C); A and C (excluding B); B and C (excluding A); or all of A, B, and C. Item A may include a single element or multiple elements. Item B may include a single element or multiple elements. Item C may include a single element or multiple elements.

In the detailed description and the claims, a list of items joined by the term "one of" may mean only one of the list items. For example, if items A and B are listed, then the phrase "one of A and B" means A only (excluding B), or B only (excluding A). In another example, if items A, B, and C are listed, then the phrase "one of A, B and C" means A only; B only; or C only. Item A may include a single element or multiple elements. Item B may include a single element or multiple elements. Item C may include a single element or multiple elements.

Additional Notes and Examples

Example 1 is a system comprising: a transmission amplifier disposed on a metal layer of a multiple metal layer circuit board, the transmission amplifier to receive a first digital signal and generate a first analog output signal, the first digital signal including a crosstalk signal caused by a second digital signal; a crosstalk cancellation circuit disposed on the metal layer, the crosstalk cancellation circuit to receive the second digital signal and generate an analog cancellation signal, the analog cancellation signal configured to cancel the crosstalk signal within the first digital signal without requiring a crosstalk cancellation capacitor; and a first conductive node to generate a first crosstalk canceled signal by combining the first analog output signal with the analog cancellation signal.

In Example 2, the subject matter of Example 1 includes the crosstalk cancellation circuit further to receive the first digital signal, wherein the analog cancellation signal is generated based on the first digital signal and the second digital signal.

In Example 3, the subject matter of Examples 1-2 includes the crosstalk cancellation circuit further including: an edge detection circuit to detect a first edge transition within the first digital signal and detect a second edge transition within the second digital signal; a pulse generation circuit to generate a pulse signal based on the first edge transition and the second edge transition; and an analog cancellation circuit to generate the analog cancellation signal based on the pulse signal.

In Example 4, the subject matter of Example 3 includes wherein: the analog cancellation circuit includes a pMOS transistor and an nMOS transistor; and the pulse generation circuit includes: a conductive pulse up trace coupled to the pMOS transistor; and a conductive pulse down trace coupled to the nMOS transistor.

In Example 5, the subject matter of Example 4 includes wherein the pulse generation circuit includes a tunable delay circuit to control a pulse width of the analog cancellation signal.

In Example 6, the subject matter of Example 5 includes wherein the analog cancellation circuit includes: a pulse up resistor coupled between the pMOS transistor and the first conductive node; and a pulse down resistor coupled between the nMOS transistor and the first conductive node.

In Example 7, the subject matter of Example 6 includes wherein: the pulse up resistor has an associated pulse up resistance coefficient configured to tune a positive amplitude of the analog cancellation signal; and the pulse up resistor has an associated pulse down resistance coefficient configured to tune a negative amplitude of the analog cancellation signal.

In Example 8, the subject matter of Examples 1-7 includes a first serial resistor coupled to the first conductive node; and a conductive pad to convey the first crosstalk canceled signal from the first serial resistor to a first transmission channel.

In Example 9, the subject matter of Examples 1-8 includes wherein the multiple metal layer circuit board includes a double data rate (DDR) memory transmitter.

Example 10 is a system comprising: a transmitter multiple integrated circuit (IC) chiplet package including a system on a chip (SOC), the SOC including a processor and a transmitter chiplet, the transmitter chiplet including: a transmission amplifier to receive a first digital signal and generate a first analog output signal, the first digital signal including a crosstalk signal caused by a second digital signal; a crosstalk cancellation circuit to receive the second digital signal and generate an analog cancellation signal, the analog cancellation signal configured to cancel the crosstalk signal within the first digital signal without requiring a crosstalk cancellation capacitor; and a first conductive node to generate a first crosstalk canceled signal by combining the first analog output signal with the analog cancellation signal.

In Example 11, the subject matter of Example 10 includes the SOC further including a memory chiplet to receive the first crosstalk cancelled signal from the transmitter chiplet.

In Example 12, the subject matter of Examples 10-11 includes the transmitter chiplet disposed within a multiple metal layer circuit board.

In Example 13, the subject matter of Examples 10-12 includes the transmitter chiplet included within a double data rate (DDR) memory transmitter.

In Example 14, the subject matter of Examples 10-13 includes the crosstalk cancellation circuit further to receive the first digital signal, wherein the analog cancellation signal is generated based on the first digital signal and the second digital signal.

In Example 15, the subject matter of Examples 10-14 includes the crosstalk cancellation circuit further including: an edge detection circuit to detect a first edge transition within the first digital signal and detect a second edge transition within the second digital signal; a pulse generation circuit to generate a pulse signal based on the first edge transition and the second edge transition; and an analog cancellation circuit to generate the analog cancellation signal based on the pulse signal.

In Example 16, the subject matter of Example 15 includes wherein: the analog cancellation circuit includes a pMOS transistor and an nMOS transistor; and the pulse generation circuit includes: a conductive pulse up trace coupled to the pMOS transistor; and a conductive pulse down trace coupled to the nMOS transistor.

In Example 17, the subject matter of Example 16 includes wherein the pulse generation circuit includes a tunable delay circuit to control a pulse width of the analog cancellation signal.

In Example 18, the subject matter of Example 17 includes wherein the analog cancellation circuit includes: a pulse up resistor coupled between the pMOS transistor and the first conductive node; and a pulse down resistor coupled between the nMOS transistor and the first conductive node.

In Example 19, the subject matter of Example 18 includes wherein: the pulse up resistor has an associated pulse up resistance coefficient configured to tune a positive amplitude of the analog cancellation signal; and the pulse up resistor has an associated pulse down resistance coefficient configured to tune a negative amplitude of the analog cancellation signal.

In Example 20, the subject matter of Examples 10-19 includes a first serial resistor coupled to the first conductive node; and a conductive pad to convey the first crosstalk canceled signal from the first serial resistor to a first transmission channel.

Example 21 is a system comprising: a CMOS transmission amplifier branch circuit to generate an analog output signal based on a first digital signal, the first digital signal including a crosstalk signal caused by a second digital signal; a CMOS crosstalk cancellation branch circuit to generate an analog cancellation signal, the analog cancellation signal configured to cancel the crosstalk signal within the first digital signal without requiring a crosstalk cancellation capacitor; and a conductive cancellation node coupled to the CMOS transmission amplifier branch circuit and to the CMOS transmission amplifier branch circuit, the conductive cancellation node to generate a first crosstalk canceled signal by combining the analog output signal with the analog cancellation signal.

In Example 22, the subject matter of Example 21 includes an input logic circuit to generate an input data up signal and an input data down signal based on the first digital signal; wherein the CMOS transmission amplifier branch circuit includes: a transmission pMOS amplifier to receive the input data up signal; a transmission nMOS amplifier to receive the input data down signal; and a transmission node coupled between the transmission pMOS amplifier and the transmission nMOS amplifier, the transmission node to conduct the analog output signal to the conductive cancellation node.

In Example 23, the subject matter of Example 22 includes a crosstalk logic circuit to generate a crosstalk pulse up signal and a crosstalk pulse down signal based on the first digital signal and the second digital signal; wherein the CMOS crosstalk cancellation branch circuit includes: a crosstalk pMOS amplifier to receive the crosstalk pulse up signal; a crosstalk nMOS amplifier to receive the crosstalk pulse down signal; and a crosstalk node coupled between the crosstalk pMOS amplifier and the crosstalk nMOS amplifier, the crosstalk node to conduct the analog cancellation signal to the conductive cancellation node.

In Example 24, the subject matter of Example 23 includes wherein: the transmission pMOS amplifier includes a first pMOS transistor and a first resistor; the transmission nMOS amplifier includes a first nMOS transistor and a second resistor; the transmission pMOS amplifier includes a second pMOS transistor and a third resistor; and the transmission nMOS amplifier includes a second nMOS transistor and a fourth resistor.

In Example 25, the subject matter of Example 24 includes wherein: the first resistor and the second resistor are associated with a transmission resistance value; the third resistor and the fourth resistor are associated with a crosstalk resistance value; the crosstalk resistance value is a coefficient scaled multiple of the transmission resistance value; and the coefficient scaled multiple is selected to tune a crosstalk cancellation amplitude.

In Example 26, the subject matter of Examples 21-25 includes the crosstalk cancellation circuit further including: an edge detection circuit to detect a first edge transition within the first digital signal and detect a second edge transition within the second digital signal; a pulse generation circuit to generate a pulse signal based on the first edge transition and the second edge transition; and an analog cancellation circuit to generate the analog cancellation signal based on the pulse signal.

In Example 27, the subject matter of Example 26 includes wherein: the analog cancellation circuit includes a pMOS transistor and an nMOS transistor; and the pulse generation circuit includes: a conductive pulse up trace coupled to the pMOS transistor; and a conductive pulse down trace coupled to the nMOS transistor.

In Example 28, the subject matter of Example 27 includes wherein the pulse generation circuit includes a tunable delay circuit to control a pulse width of the analog cancellation signal.

In Example 29, the subject matter of Example 28 includes wherein the analog cancellation circuit includes: a pulse up resistor coupled between the pMOS transistor and the first conductive node; and a pulse down resistor coupled between the nMOS transistor and the first conductive node.

In Example 30, the subject matter of Example 29 includes wherein: the pulse up resistor has an associated pulse up resistance coefficient configured to tune a positive amplitude of the analog cancellation signal; and the pulse up resistor has an associated pulse down resistance coefficient configured to tune a negative amplitude of the analog cancellation signal.

In Example 31, the subject matter of Examples 21-30 includes a first serial resistor coupled to the first conductive node; and a conductive pad to convey the first crosstalk canceled signal from the first serial resistor to a first transmission channel.

Example 32 is a method comprising: generating, at a transmission amplifier, a first analog output signal based on a first digital signal, the first digital signal including a crosstalk signal caused by a second digital signal; generating, at a crosstalk cancellation circuit, an analog cancellation signal configured to cancel the crosstalk signal within the first digital signal without requiring a crosstalk cancellation capacitor; and generating, at a first conductive node, a first crosstalk canceled signal by combining the first analog output signal with the analog cancellation signal.

In Example 33, the subject matter of Example 32 includes receiving the first digital signal at the crosstalk cancellation circuit, wherein the analog cancellation signal is generated based on the first digital signal and the second digital signal.

In Example 34, the subject matter of Examples 32-33 includes detecting, at an edge detection circuit within the crosstalk cancellation circuit, a first edge transition within the first digital signal and a second edge transition within the second digital signal; generating, at a pulse generation circuit, a pulse signal based on the first edge transition and the second edge transition; and generating, at an analog cancellation circuit, the analog cancellation signal based on the pulse signal.

In Example 35, the subject matter of Example 34 includes wherein: the analog cancellation circuit includes a pMOS transistor and an nMOS transistor; and the pulse generation circuit includes: a conductive pulse up trace coupled to the pMOS transistor; and a conductive pulse down trace coupled to the nMOS transistor.

In Example 36, the subject matter of Example 35 includes wherein the pulse generation circuit includes a tunable delay circuit to control a pulse width of the analog cancellation signal.

In Example 37, the subject matter of Example 36 includes wherein the analog cancellation circuit includes: a pulse up resistor coupled between the pMOS transistor and the first conductive node; and a pulse down resistor coupled between the nMOS transistor and the first conductive node.

In Example 38, the subject matter of Example 37 includes wherein: the pulse up resistor has an associated pulse up resistance coefficient configured to tune a positive amplitude of the analog cancellation signal; and the pulse up resistor has an associated pulse down resistance coefficient configured to tune a negative amplitude of the analog cancellation signal.

In Example 39, the subject matter of Examples 32-38 includes conveying the first crosstalk canceled signal from the first conductive node through a first serial resistor to a first transmission channel.

Example 40 is at least one non-transitory machine-readable storage medium, comprising a plurality of instructions that, responsive to being executed with processor circuitry of a computer-controlled device, cause the processor circuitry to: generate, at a transmission amplifier, a first analog output signal based on a first digital signal, the first digital signal including a crosstalk signal caused by a second digital signal; generate, at a crosstalk cancellation circuit, an analog cancellation signal configured to cancel the crosstalk signal within the first digital signal without requiring a crosstalk cancellation capacitor; and generate, at a first conductive node, a first crosstalk canceled signal by combining the first analog output signal with the analog cancellation signal.

In Example 41, the subject matter of Example 40 includes the instructions further causing the processor circuitry to receive the first digital signal at the crosstalk cancellation circuit further, wherein the analog cancellation signal is generated based on the first digital signal and the second digital signal.

In Example 42, the subject matter of Examples 40-41 includes the instructions further causing the processor circuitry to: detect, at an edge detection circuit within the crosstalk cancellation circuit, a first edge transition within the first digital signal and a second edge transition within the second digital signal; generate, at a pulse generation circuit, a pulse signal based on the first edge transition and the second edge transition; and generate, at an analog cancellation circuit, the analog cancellation signal based on the pulse signal.

In Example 43, the subject matter of Example 42 includes wherein: the analog cancellation circuit includes a pMOS transistor and an nMOS transistor; and the pulse generation circuit includes: a conductive pulse up trace coupled to the pMOS transistor; and a conductive pulse down trace coupled to the nMOS transistor.

In Example 44, the subject matter of Example 43 includes wherein the pulse generation circuit includes a tunable delay circuit to control a pulse width of the analog cancellation signal.

In Example 45, the subject matter of Example 44 includes wherein the analog cancellation circuit includes: a pulse up resistor coupled between the pMOS transistor and the first conductive node; and a pulse down resistor coupled between the nMOS transistor and the first conductive node.

In Example 46, the subject matter of Example 45 includes wherein: the pulse up resistor has an associated pulse up resistance coefficient configured to tune a positive amplitude of the analog cancellation signal; and the pulse up resistor has an associated pulse down resistance coefficient configured to tune a negative amplitude of the analog cancellation signal.

In Example 47, the subject matter of Examples 40-46 includes the instructions further causing the processor circuitry to convey the first crosstalk canceled signal from the first conductive node through a first serial resistor to a first transmission channel.

Example 48 is at least one machine-readable medium including instructions that, when executed by processing circuitry, cause the processing circuitry to perform operations to implement of any of Examples 1-47.

Example 49 is an apparatus comprising means to implement of any of Examples 1-47.

Example 50 is a system to implement of any of Examples 1-47.

Example 51 is a method to implement of any of Examples 1-47.

The subject matter of any Examples above may be combined in any combination.

The above description and the drawings illustrate some embodiments of the inventive subject matter to enable those skilled in the art to practice the embodiments of the inventive subject matter. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:

a transmission amplifier disposed on a metal layer of a multiple metal layer circuit board, the transmission amplifier to receive a first digital signal and generate a first analog output signal, the first digital signal including a crosstalk signal caused by a second digital signal;

a crosstalk cancellation circuit disposed on the metal layer, the crosstalk cancellation circuit to receive the second digital signal and generate an analog cancellation signal, the analog cancellation signal configured to cancel the crosstalk signal within the first digital signal without requiring a crosstalk cancellation capacitor, the crosstalk cancellation circuit including:
an edge detection circuit to detect a first edge transition within the first digital signal and detect a second edge transition within the second digital signal;
a pulse generation circuit to generate a pulse signal based on the first edge transition and the second edge transition; and
an analog cancellation circuit to generate the analog cancellation signal based on the pulse signal; and
a first conductive node to generate a first crosstalk canceled signal by combining the first analog output signal with the analog cancellation signal.

2. The system of claim 1, the crosstalk cancellation circuit further to receive the first digital signal, wherein the analog cancellation signal is generated based on the first digital signal and the second digital signal.

3. The system of claim 1, wherein:
the analog cancellation circuit includes a pMOS transistor and an nMOS transistor; and
the pulse generation circuit includes:
a conductive pulse up trace coupled to the pMOS transistor; and
a conductive pulse down trace coupled to the nMOS transistor.

4. The system of claim 3, wherein the pulse generation circuit includes a tunable delay circuit to control a pulse width of the analog cancellation signal.

5. The system of claim 4, wherein the analog cancellation circuit includes:
a pulse up resistor coupled between the pMOS transistor and the first conductive node; and
a pulse down resistor coupled between the nMOS transistor and the first conductive node.

6. The system of claim 5, wherein:
the pulse up resistor has an associated pulse up resistance coefficient configured to tune a positive amplitude of the analog cancellation signal; and
the pulse up resistor has an associated pulse down resistance coefficient configured to tune a negative amplitude of the analog cancellation signal.

7. The system of claim 1, further including:
a first serial resistor coupled to the first conductive node; and
a conductive pad to convey the first crosstalk canceled signal from the first serial resistor to a first transmission channel.

8. The system of claim 1, wherein the multiple metal layer circuit board includes a double data rate (DDR) memory transmitter.

9. A system comprising:
a transmitter multiple integrated circuit (IC) chiplet package including a system on a chip (SOC), the SOC including a processor and a transmitter chiplet, the transmitter chiplet including:
a transmission amplifier to receive a first digital signal and generate a first analog output signal, the first digital signal including a crosstalk signal caused by a second digital signal;
a crosstalk cancellation circuit to receive the second digital signal and generate an analog cancellation signal, the analog cancellation signal configured to cancel the crosstalk signal within the first digital signal without requiring a crosstalk cancellation capacitor, the crosstalk cancellation circuit including:
an edge detection circuit to detect a first edge transition within the first digital signal and detect a second edge transition within the second digital signal;
a pulse generation circuit to generate a pulse signal based on the first edge transition and the second edge transition; and
an analog cancellation circuit to generate the analog cancellation signal based on the pulse signal; and
a first conductive node to generate a first crosstalk canceled signal by combining the first analog output signal with the analog cancellation signal.

10. The system of claim 9, the SOC further including a memory chiplet to receive the first crosstalk canceled signal from the transmitter chiplet.

11. The system of claim 9, the transmitter chiplet disposed within a multiple metal layer circuit board.

12. The system of claim 9, the transmitter chiplet included within a double data rate (DDR) memory transmitter.

13. The system of claim 9, wherein:
the analog cancellation circuit includes a pMOS transistor and an nMOS transistor; and
the pulse generation circuit includes:
a conductive pulse up trace coupled to the pMOS transistor; and
a conductive pulse down trace coupled to the nMOS transistor.

14. A system comprising:
a CMOS transmission amplifier branch circuit to generate an analog output signal based on a first digital signal, the first digital signal including a crosstalk signal caused by a second digital signal;
a CMOS crosstalk cancellation branch circuit to generate an analog cancellation signal, the analog cancellation signal configured to cancel the crosstalk signal within the first digital signal without requiring a crosstalk cancellation capacitor; and
a conductive cancellation node coupled to the CMOS transmission amplifier branch circuit and to the CMOS crosstalk cancellation branch circuit, the conductive cancellation node to generate a first crosstalk canceled signal by combining the analog output signal with the analog cancellation signal;
an input logic circuit to generate an input data up signal and an input data down signal based on the first digital signal;
wherein the CMOS transmission amplifier branch circuit includes:
a transmission pMOS amplifier to receive the input data up signal;
a transmission nMOS amplifier to receive the input data down signal; and
a transmission node coupled between the transmission pMOS amplifier and the transmission nMOS amplifier, the transmission node to conduct the analog output signal to the conductive cancellation node.

15. The system of claim 14, further including a crosstalk logic circuit to generate a crosstalk pulse up signal and a crosstalk pulse down signal based on the first digital signal and the second digital signal;
wherein the CMOS crosstalk cancellation branch circuit includes:
a crosstalk pMOS amplifier to receive the crosstalk pulse up signal;

a crosstalk nMOS amplifier to receive the crosstalk pulse down signal; and a crosstalk node coupled between the crosstalk pMOS amplifier and the crosstalk nMOS amplifier, the crosstalk node to conduct the analog cancellation signal to the conductive cancellation node.

16. The system of claim 15, wherein:

the transmission pMOS amplifier includes a first pMOS transistor and a first resistor;

the transmission nMOS amplifier includes a first nMOS transistor and a second resistor;

the transmission pMOS amplifier includes a second pMOS transistor and a third resistor; and the transmission nMOS amplifier includes a second nMOS transistor and a fourth resistor.

17. The system of claim 16, wherein:

the first resistor and the second resistor are associated with a transmission resistance value;

the third resistor and the fourth resistor are associated with a crosstalk resistance value;

the crosstalk resistance value is a coefficient scaled multiple of the transmission resistance value; and the coefficient scaled multiple is selected to tune a crosstalk cancellation amplitude.

* * * * *